(12) United States Patent
Baek et al.

(10) Patent No.: US 10,483,549 B2
(45) Date of Patent: Nov. 19, 2019

(54) METHOD OF MANUFACTURING ELECTRODE CURRENT COLLECTOR FOR SECONDARY BATTERY AND ELECTRODE INCLUDING ELECTRODE CURRENT COLLECTOR MANUFACTURED USING THE METHOD

(71) Applicant: LG Chem, Ltd., Seoul (KR)

(72) Inventors: Joo Yul Baek, Daejeon (KR); Song Taek Oh, Daejeon (KR); Young Geun Choi, Daejeon (KR)

(73) Assignee: LG Chem, Ltd. (KR)

( * ) Notice: Subject to any disclaimer, the term of this patent is extended or adjusted under 35 U.S.C. 154(b) by 46 days.

(21) Appl. No.: 15/752,105

(22) PCT Filed: Mar. 15, 2017

(86) PCT No.: PCT/KR2017/002814
§ 371 (c)(1),
(2) Date: Feb. 12, 2018

(87) PCT Pub. No.: WO2017/164563
PCT Pub. Date: Sep. 28, 2017

(65) Prior Publication Data
US 2018/0241045 A1 Aug. 23, 2018

(30) Foreign Application Priority Data

Mar. 21, 2016 (KR) .................. 10-2016-0033535
Mar. 10, 2017 (KR) .................. 10-2017-0030761

(51) Int. Cl.
*H01M 4/00* (2006.01)
*H01M 4/66* (2006.01)
(Continued)

(52) U.S. Cl.
CPC .......... *H01M 4/667* (2013.01); *C01B 32/174* (2017.08); *H01M 4/0404* (2013.01);
(Continued)

(58) Field of Classification Search
CPC ........ H01M 4/04; H01M 4/0404; H01M 4/66; H01M 4/663; H01M 4/75; H01M 10/0525
See application file for complete search history.

(56) References Cited

U.S. PATENT DOCUMENTS

| 7,592,050 B2 | 9/2009 | Watanabe et al. |
| 10,193,160 B2 | 1/2019 | Shibano et al. |

(Continued)

FOREIGN PATENT DOCUMENTS

| EP | 2037516 A1 | 3/2009 |
| EP | 2816640 A1 | 12/2014 |

(Continued)

OTHER PUBLICATIONS

Extended European Search Report including Written Opinion for Application No. EP17770534.0 dated May 17, 2018.
(Continued)

*Primary Examiner* — Chanceity N Robinson
*Assistant Examiner* — Monique M Wills
(74) *Attorney, Agent, or Firm* — Lerner, David, Littenberg, Krumholz & Mentlik, LLP

(57) ABSTRACT

The present invention relates to a method of manufacturing an electrode current collector for a secondary battery and an electrode including an electrode current collector manufactured using the method. In particular, provided herein are a method of manufacturing an electrode current collector for a secondary battery which includes forming a CNT coating layer on a surface of an electrode current collector to increase electrical conductivity, and an electrode including
(Continued)

an electrode current collector manufactured according to the method.

16 Claims, 6 Drawing Sheets

(51) Int. Cl.
- *H01M 10/0525* (2010.01)
- *C01B 32/174* (2017.01)
- *H01M 4/04* (2006.01)
- *B82Y 30/00* (2011.01)
- *B82Y 40/00* (2011.01)
- *H01M 4/02* (2006.01)

(52) U.S. Cl.
CPC ......... *H01M 4/0419* (2013.01); *H01M 4/661* (2013.01); *H01M 4/663* (2013.01); *H01M 10/0525* (2013.01); *B82Y 30/00* (2013.01); *B82Y 40/00* (2013.01); *C01B 2202/06* (2013.01); *C01B 2202/36* (2013.01); *H01M 2004/027* (2013.01); *Y10S 977/752* (2013.01); *Y10S 977/842* (2013.01); *Y10S 977/892* (2013.01); *Y10S 977/948* (2013.01)

(56) References Cited

U.S. PATENT DOCUMENTS

| | | | |
|---|---|---|---|
| 2006/0134326 A1 | 6/2006 | Watanabe et al. | |
| 2008/0299460 A1 | 12/2008 | Feng et al. | |
| 2011/0195311 A1 | 8/2011 | Kim et al. | |
| 2012/0121986 A1* | 5/2012 | Balu | B82Y 30/00 429/231.1 |
| 2012/0282419 A1 | 11/2012 | Ahn et al. | |
| 2013/0252068 A1 | 9/2013 | Lee et al. | |
| 2014/0335418 A1 | 11/2014 | Tamaki et al. | |
| 2015/0093649 A1 | 4/2015 | Arai et al. | |
| 2015/0228982 A1 | 8/2015 | Shibano et al. | |
| 2017/0062831 A1 | 3/2017 | Predtechenskiy et al. | |
| 2017/0144133 A1* | 5/2017 | Kim | B01J 37/0225 |

FOREIGN PATENT DOCUMENTS

| | | | |
|---|---|---|---|
| JP | 2002226209 | A | 8/2002 |
| JP | 2006176362 | A | 7/2006 |
| KR | 20080091883 | A | 10/2008 |
| KR | 20110084110 | A | 7/2011 |
| KR | 20110092059 | A | 8/2011 |
| KR | 20110137395 | A | 12/2011 |
| KR | 101101153 | B1 | 1/2012 |
| KR | 20130106681 | A | 9/2013 |
| KR | 20130120290 | A | 11/2013 |
| WO | 2014042080 | A1 | 3/2014 |
| WO | 2015178801 | A1 | 11/2015 |

OTHER PUBLICATIONS

Search report from International Application No. PCT/KR2017/002814, dated Jun. 23, 2017.

* cited by examiner

METHOD OF MANUFACTURING ELECTRODE CURRENT COLLECTOR FOR SECONDARY BATTERY AND ELECTRODE INCLUDING ELECTRODE CURRENT COLLECTOR MANUFACTURED USING THE METHOD

CROSS-REFERENCE TO RELATED APPLICATION

This application is a national phase entry under 35 U.S.C. 371 of International Application No. PCT/KR2017/002814, filed on Mar. 15, 2017 which claims priority to Korean Patent Application Nos. 10-2016-0033535, filed on Mar. 21, 2016, and 10-2017-0030761filed on Mar. 10, 2017, the disclosures of which are incorporated herein by reference.

TECHNICAL FIELD

The present invention relates to a method of manufacturing an electrode current collector for a secondary battery and an electrode including an electrode current collector manufactured using the method, and more particularly, to a method of manufacturing an electrode current collector for a secondary battery that enables a carbon nanotube coating layer to be uniformly formed on a surface of a thin electrode current collector without physical damage thereto, and an electrode including an electrode current collector manufactured using the method.

BACKGROUND ART

In line with an increase in technology development of and demand for mobile devices, demand for secondary batteries as energy sources is rapidly increasing. Among these secondary batteries, lithium secondary batteries which have high energy density and discharge voltage have been extensively studied and are commercially available and widely used.

Generally, a lithium secondary battery has a structure in which an electrode assembly consisting of a positive electrode, a negative electrode, and a separator is impregnated with a lithium electrolyte, and the positive or negative electrode is manufactured by coating an electrode current collector with a positive or negative electrode slurry.

The positive electrode slurry and the negative electrode slurry include electrode mixtures including: a lithium transition metal oxide and a carbon-based active material, respectively, as an electrode active material for storing energy; a conductive material to impart electrical conductivity; and a binder that adheres the positive or negative electrode slurry to a current collector to impart adhesion therebetween, N-methylpyrrolidone (NMP), and the like. In this case, copper (Cu) foil, aluminum (Al) foil, or the like is generally used as the electrode current collector.

However, in the manufacture of such electrode, adhesion between the electrode mixture and the current collector is reduced in a pressing process or the subsequent manufacturing process and, as a result, dust particles or the like may be generated. In addition, during operation of a battery, problems such as peeling of the electrode active material attached to a surface of the current collector due to interfacial resistance between the current collector and the electrode slurry may occur. Such reduction in adhesion and peeling of an active material due to this result in an increase in internal resistance of a battery, thus causing significant deterioration of battery performance such as deterioration of output characteristics, a decrease in battery capacity, and the like.

To address these problems, a method of increasing adhesion between a current collector and an electrode active material by forming fine irregularities at a surface of the current collector via etching has been proposed. However, this method is advantageous in that a current collector having a high specific surface area can be obtained by a simple process, while having a problem such as a reduction in the lifespan of the current collector due to the etching treatment.

As another alternative, a method of increasing adhesion between a positive or negative electrode current collector and an electrode active material by coating a surface of the positive or negative electrode current collector with a silane-based coupling agent, or forming an anchor film on a positive or negative electrode current collector using a coating solution including a conductive material, an adhesive resin, and an alcohol has been proposed. However, these methods are advantageous in that high adhesion is obtained between the current collector and the active material, while having a problem such as deterioration of battery performance due to high internal resistance.

Therefore, there is an urgent need to develop a method of increasing adhesion between a current collector and an electrode mixture and also improving output characteristics by reducing internal resistance of a battery.

DISCLOSURE

Technical Problem

The present invention has been made in view of the above problems, and provides a method of manufacturing an electrode current collector for a secondary battery that enables improvement in adhesion between an electrode current collector and an electrode slurry and electrical conductivity.

The present invention also provides an electrode including an electrode current collector manufactured using the method.

Technical Solution

According to an embodiment of the present invention, a method of manufacturing an electrode current collector for a secondary battery includes: preparing a carbon nanotube (CNT) dispersion by dispersing CNTs in a dispersion solvent; forming a CNT film on a water surface by spraying the CNT dispersion onto water; forming a CNT coating layer on metal foil by transferring the metal foil in a roll-to-roll manner after being unwound while passing through the water at an angle such that one surface of the metal foil is brought into contact with one end of the CNT film formed on the water surface; and curing the CNT coating layer by heat treatment while rewinding the metal foil with the CNT coating layer formed thereon.

According to another embodiment of the present invention, an electrode for a secondary battery includes: an electrode current collector manufactured according to the manufacturing method of the present invention and including a CNT coating layer formed on a surface thereof; and an electrode mixture layer formed on a surface of the CNT coating layer. At this time, the CNT coating layer includes multi-walled CNTs.

The electrode for a secondary battery may be a negative electrode.

Advantageous Effects

According to the present invention, a carbon nanotube coating layer having a uniform thickness can be formed on a surface of an electrode current collector using a simple method without physical damage thereto, and thus the lifespan of the current collector can be increased. In addition, adhesion between an electrode mixture and the current collector can be significantly increased, and thus problems occurring due to low adhesion, such as generation of dust particles, peeling of an electrode active material, an increase in internal resistance of a battery, deterioration of battery characteristics, and the like, can be addressed. Accordingly, output characteristics of a secondary battery can be significantly enhanced.

BEST MODE

Figure 1:
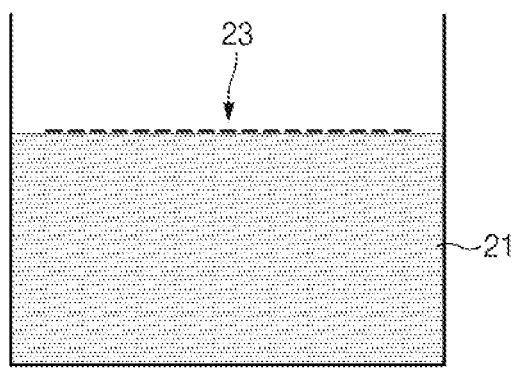
FIGS. 1 to 3 are cross-sectional views of processes for explaining a method of manufacturing an electrode current collector, according to an embodiment of the present invention.

Hereinafter, the present invention will be described in more detail.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

Conventionally, there have been attempts to apply carbon nanotubes (CNTs) to enhance output characteristics of secondary batteries. For example, a technology for forming a carbon nanotube coating layer on a current collector using a method such as dip coating, die coating, or the like has been proposed. However, an electrode current collector has a very thin thickness, and thus, when this method is used, a surface of the electrode current collector is damaged, and thus the lifespan of the current collector is reduced. In addition, it is difficult to form a carbon nanotube coating layer having a uniform thickness using this method, and thus adhesion between the current collector and an electrode slurry is decreased, resulting in a tendency of an electrode active material to peel off from the current collector. Such reduction in the lifespan of the current collector, or peeling of the active material due to reduced adhesion result in increased internal resistance of a battery, thus causing significant deterioration of battery performance such as deterioration of output characteristics, a decrease in battery capacity, and the like.

Therefore, the present invention provides a method of manufacturing an electrode current collector for a secondary battery by forming a carbon nanotube coating layer having a uniform thickness on a surface of the current collector without physical damage thereto by using a simple method, instead of using a method such as dip coating, die coating, or the like, to increase adhesion between the current collector and an electrode mixture and enhance conductivity between the current collector and an active material, and an electrode current collector for a secondary battery, manufactured using the method.

In particular, in one embodiment of the present invention, a method of manufacturing an electrode current collector for a secondary battery includes: preparing a CNT dispersion by dispersing CNTs in a dispersion solvent; forming a CNT film on a water surface by spraying the CNT dispersion onto water; forming a CNT coating layer on metal foil by transferring the metal foil in a roll-to-roll manner after being unwound while passing through the water at an angle such that one surface of the metal foil is brought into contact with one end of the CNT film formed on the water surface; and curing the CNT coating layer by heat treatment while rewinding the metal foil with the CNT coating layer formed thereon.

Hereinafter, the method of the present invention will be described in detail with reference to the accompanying drawings. The present invention may be embodied in many different forms, but is not limited to the embodiments set forth herein. Throughout the specification, like reference numerals denote like elements.

Figure 2:
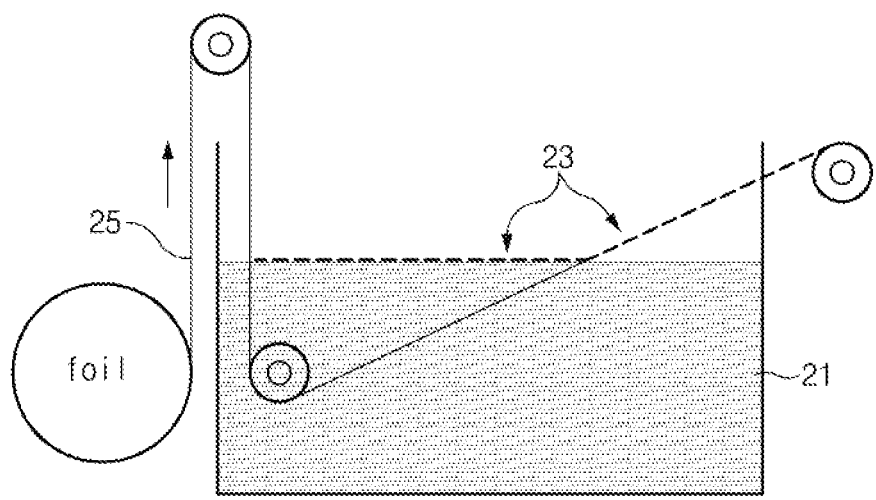
Figure 3:
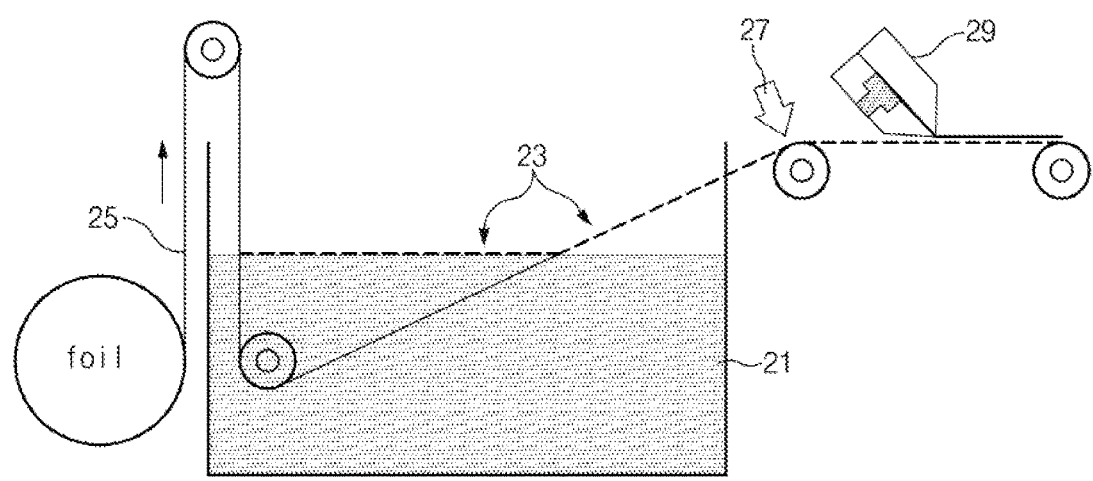

FIGS. 1 to 3 are cross-sectional views of processes for explaining a method of manufacturing an electrode current collector, according to an embodiment of the present invention.

First, to manufacture an electrode current collector for a secondary battery according to the present invention, a CNT dispersion is prepared by dispersing CNTs in a dispersion solvent (process 1).

In this regard, the dispersion solvent is not particularly limited as long as it can effectively disperse CNTs and is readily soluble in water. Preferably, the dispersion solvent may be one selected from the group consisting of distilled water, alcohols such as ethanol and the like, acetonitrile, and acetone, or a mixture of two or more of these solvents may also be used.

The CNTs are a highly crystalline carbon-based material in which hexagonally arranged carbon atoms take a tube form, and have very high electrical conductivity and lithium ion conductivity, and thus may provide a path for reacting with lithium ions in an electrode. Accordingly, uniform current and voltage distribution may be maintained in the electrode during cycles of charging and discharging, resulting in significant improvement of cycle characteristics. In addition, the CNTs have excellent tensile strength, i.e., approximately 100 times or more greater than that of steel due to strong covalent bonds of carbon atoms, exhibit non-conductive, conductive or semiconducting properties according to unique chirality, and have high resistance to fracturing, and thus may prevent the current collector from being deformed by repetition of charging/discharging or external force and prevent the surface of the current collector from being oxidized in an abnormal battery environment such as high temperature, overcharging, or the like, whereby battery safety may be significantly enhanced.

In the method of the present invention, the CNTs may include multi-walled CNTs (MWCNTs) formed as three or more layers and having a diameter of about 5 nm to about 100 nm.

In addition, in the method of the present invention, in some cases, the CNTs may further optionally include, in addition to the MWCNTs, single-walled CNTs (SWCNTs) formed as a single layer and having a diameter of about 1 nm, or double-walled CNTs (DWCNTs) formed as double layers and having a diameter of about 1.4 nm to about 3 nm.

In addition, the CNTs of the present invention may further include bundle type CNTs in which a plurality of CNTs are arranged in parallel or intertwine with each other, or non-bundle type or entangled type CNTs in which CNTs agglomerate with each other in an irregular form.

The bundle type CNTs may basically have a shape in which a plurality of CNT strands are grouped together to form a bundle, and these strands have a linear shape, a curved shape, or a mixed shape thereof. In addition, the bundle type CNTs may also have a linear shape, a curved shape, or a mixed shape thereof. According to one embodiment, such bundle type CNTs may have a thickness of 50 nm to 100 nm.

In the method of manufacturing an electrode current collector of the present invention, the CNT dispersion may be prepared by dispersing about 0.1 wt % to about 10 wt % of CNTs in the dispersion solvent. At this time, when the amount of the CNTs is less than 0.1 wt %, the CNT film is not uniformly formed on the water surface, and, when the amount of the CNTs is greater than 10 wt %, the CNT film formed on the water surface agglomerates, resulting in reduced yield.

Subsequently, a CNT film is formed on a water surface by spraying the CNT dispersion prepared in the above process 1 onto water (process 2).

As illustrated in FIG. 1, water 21 having high surface tension is added to a water bath, and then a CNT dispersion is sprayed onto the water 21.

As a result, the dispersion solvent is completely dissolved in the water 21, and, consequently, a CNT film 23 may be formed on a surface of the water 21.

At this time, a spraying rate of the dispersion may appropriately vary according to concentration, and may range from about 1 L/min to about 100 L/min.

Next, as illustrated in FIG. 2, metal foil 25 is transferred in a roll-to-roll manner after being unwound while passing through the water 21 at an angle such that one surface of the metal foil 25 is brought into contact with one end of the CNT film 23 formed on the water surface, thereby forming a CNT coating layer on the metal foil 25 (process 3).

At this time, the metal foil 25 is transferred at a rate of 10 m/min to 50 m/min, which is within a range of an operating speed of a coater, and a transfer angle of the metal foil 25 with respect to the water surface may range from about 20° to about 45°. When the transfer angle is 45° or less, the CNT film formed on the water surface may be effectively adsorbed onto the metal foil.

When the transfer rate is less than 10 m/min, coating yield is decreased, and, when the transfer rate is greater than 50 m/min, uniformity in the coating process is decreased. In addition, in a case in which the metal foil is exposed to the water surface, when an angle of the metal foil with respect to the water surface is less than 20° or greater than 45°, it is difficult to control a range of the CNT film brought into contact with the one surface of the metal foil, and thus it is impossible to form a CNT coating layer with uniform thickness on the metal foil.

In the method of manufacturing an electrode current collector of the present invention, the metal foil is a part in which migration of electrons occurs via an electrochemical reaction of an active material, and is not particularly limited as long as it does not cause any chemical change and has conductivity to be used as an electrode current collector. For example, the metal foil may be made of copper, stainless steel, aluminum, nickel, titanium, or calcined carbon; stainless steel surface-treated with carbon, nickel, titanium, or silver; an aluminum-cadmium alloy; or the like.

The metal foil may typically have a thickness of 3 μm to 500 μm.

The metal foil may be in any of various forms including a film, a sheet, a net, a porous structure, a foam, non-woven fabric, and the like.

As such, while the metal foil 25 is transferred while passing through water, using the method of the present invention, a CNT layer having a uniform thickness may be formed on the metal foil 25.

That is, the CNT film floating on the water surface by surface tension is adsorbed onto an upper end of the metal foil positioned below the CNT film by the Van der Waals attraction acting between the CNTs and the metal current collector, thereby forming a thin CNT coating layer.

The CNT coating layer may have a thickness of 10 nm to 5 μm. When the thickness of the CNT coating layer is too small, i.e., less than 10 nm, it is difficult to improve electrical conductivity and obtain a rate characteristics improvement effect according thereto. On the other hand, when the thickness of the CNT coating layer is greater than 5 μm, it results in a reduction in the absolute amount of an electrode active material relative to a standard, and thus battery capacity may be decreased.

Lastly, as illustrated in FIG. 3, the metal foil 25 with the CNT coating layer formed thereon is subjected to heat treatment 27 while being rewound, thereby curing the CNT coating layer (process 4).

The curing process may be performed by applying hot air at a temperature of 70° C. to 130° C. for a residence time of 10 seconds to 1 minute.

At this time, when the hot air temperature is less than 70° C., the CNT coating layer may be insufficiently dried, and, when the hot air temperature is greater than 130° C., the CNT coating layer may be oxidized.

Generally, because a path for transfer of electrons in an electrode is mainly formed by a conductive material, not only the formation of a path between an active material and a conductive material is important, but the formation of a path between metal foil as a current collector and a conductive material is also very important. However, a conductive material is mainly distributed in the vicinity of an active material, and thus it is difficult for the transfer of electrons to smoothly occur. Thus, to increase electronic conductivity between an active material layer and a current collector, a method of surface-treating a current collector has been proposed, but this method involves complicated processes and manufacturing costs increase.

In contrast, according to the method of present invention, a CNT coating layer is formed on a surface of an electrode current collector by only a simple coating process without a separate mechanical device or an additional process, thereby securing a conductive path for a conductive material distributed in the vicinity of an active material.

Furthermore, the time spent for forming the coating layer on a surface of the current collector is merely several minutes, and, as described above, desired effects may be sufficiently achieved even by a small coating area, and thus the coating layer may be formed by rapid and continuous processes. In addition, because the CNT coating process does not include etching or the like, damage to the surface of the current collector or deterioration of the strength of the current collector may be prevented.

As described above, in the method of the present invention, the CNT coating layer is first formed on the surface of the electrode current collector before forming an electrode mixture layer, and, accordingly, a specific surface area between the active material and the current collector may be increased and electronic conductivity therebetween may be significantly increased. In particular, although CNTs in the form of a long, linear conductive material may form an excellent conductive path, the dispersion thereof in an electrode slurry is difficult. Thus, as in the present invention, the CNT coating layer is previously formed on the current collector, and, accordingly, this structure may be more easily applied to an electrode, and it is predicted that the amount of a conductive material in the electrode slurry may be decreased.

In addition, referring to FIG. 3, the method of manufacturing an electrode current collector may further include forming an electrode mixture layer by applying an electrode slurry on the CNT coating layer using a coater 29 for forming an active material while transferring the metal foil 25 with the CNT coating layer formed thereon, and then pressing and drying the resulting structure.

At this time, the electrode slurry may include a negative electrode slurry.

An embodiment of the present invention also provides an electrode for a secondary battery, including an electrode current collector manufactured using the above-described manufacturing method of the present invention. In particular, the electrode for a secondary battery, according to the present invention, is manufactured according to the manufacturing method of the present invention, and includes: an electrode current collector with a CNT coating layer formed on a surface thereof; and an electrode mixture layer formed on a surface of the CNT coating layer.

At this time, the CNT coating layer may include MWCNTs, and the CNT coating layer may have a thickness of 10 nm to 5 µm, preferably, 30 nm to 3 µm.

Preferably, the electrode for a secondary battery of the present invention may be a negative electrode, but the present invention is not limited thereto.

The electrode mixture layer may be formed via application of a negative electrode slurry including a negative electrode active material, a conductive material, and, optionally, at least one additive selected from the group consisting of a binder and a filler.

In particular, the negative electrode active material may be a carbonaceous material. As a non-limiting example, the carbonaceous material may be one selected from the group consisting of graphite, graphitizable carbon (soft carbon), non-graphitizable carbon (hard carbon), carbon black, graphene, and graphene oxides, or a mixture of two or more of these materials. In particular, the graphite may include natural graphite or artificial graphite, e.g., mesophase carbon microbeads (MCMBs), mesophase pitch-based carbon fiber (MPCF), or the like.

In addition, the conductive material is not particularly limited so long as it does not cause chemical changes in the fabricated battery and has conductivity. Non-limiting examples of conductive materials include graphite such as natural or artificial graphite; carbonaceous materials such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The conductive material may generally be included in an amount of 1 wt % to 30 wt % based on the total weight of a slurry.

In addition, the binder is not particularly limited as long as it assists in binding of an active material to a conductive material or the like and binding of an active material to a current collector. Non-limiting examples of the binder include polyvinylidenefluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene monomers (EPDMs), sulfonated EPDMs, styrene-butadiene rubber, fluorine rubber, and various copolymers.

The binder may be generally included in an amount of 1 wt % to 30 wt % based on the total weight of a slurry.

In addition, the filler is a component that suppresses the expansion of an electrode and may be optionally used, and is not particularly limited as long as it is a fibrous material that does not cause any chemical change in the fabricated battery. For example, the filler may be an olefin-based polymer such as polyethylene, polypropylene, or the like; a fibrous material such as glass fiber, carbon fiber, or the like.

Hereinafter, a structure of an electrode for a secondary battery of the present invention manufactured according to the method of the present invention will be described in more detail with reference to FIGS. 4 and 5.

Figure 4:
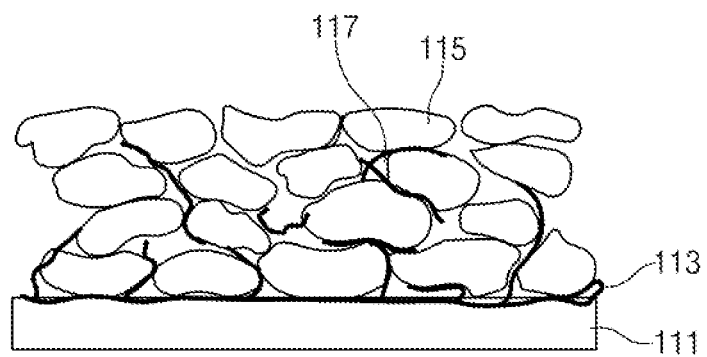
FIG. 4 is a cross-sectional view of an electrode manufactured according to an embodiment of the present invention.
Figure 5:
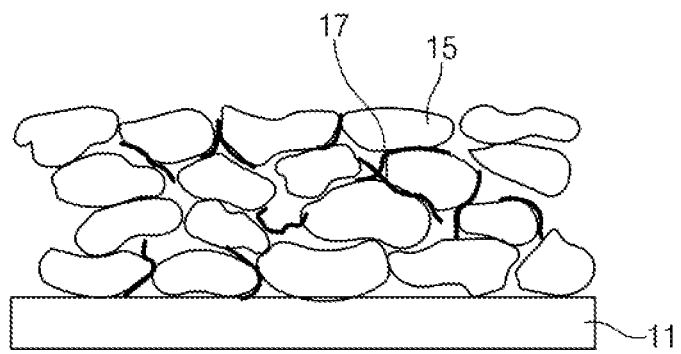
FIG. 5 is a cross-sectional view of a general electrode.

FIG. 4 illustrates a cross-section of an electrode including an electrode current collector with a CNT coating layer formed thereon, manufactured according to the method of the present invention, and FIG. 5 is a cross-sectional view of a general electrode.

That is, as illustrated in FIG. 4, the electrode for a secondary battery of the present invention has a structure in which a CNT coating layer 113 is formed on a surface of an electrode current collector 111, and an electrode mixture layer including an electrode active material 115 and a conductive material 117 is formed on the CNT coating layer 113.

As such, the CNT coating layer is uniformly formed on the electrode current collector, and thus forms very stable binding such as direct chemical binding or the like with the electrode active material and the conductive material included in the electrode mixture layer.

Thus, as compared to a general electrode including only an electrode mixture layer including an electrode active material 15 and a conductive material 17 on an electrode current collector 11 as illustrated in FIG. 5, the electrode of the present invention may significantly increase adhesion between an electrode mixture and a current collector due to the CNT coating layer formed on the current collector, and thus peeling of an electrode active material, an increase in internal resistance of a battery, and deterioration of battery characteristics may be prevented. In addition, a binder and a conductive material included in the electrode mixture may be added in a minimum amount, and thus electrical conductivity may be enhanced, resulting in significant improvement of output characteristics of a secondary battery.

The present invention also provides a secondary battery including the electrode as a positive electrode and/or a negative electrode. The secondary battery is preferably a lithium secondary battery.

The lithium secondary battery has a structure in which an electrode assembly consisting of a positive electrode, a negative electrode, and a separator therebetween is impregnated with a lithium salt-containing non-aqueous electrolyte.

The positive electrode may be manufactured by coating a positive electrode current collector with a positive electrode slurry including a positive electrode active material, a conductive material, and, optionally, at least one additive selected from the group consisting of a binder and a filler.

At this time, the positive electrode active material may be a known positive electrode active material for a secondary battery. As a representative example, the positive electrode active material may include one selected from the group consisting of $LiCoO_2$, $LiNiO_2$, $LiMnO_2$, $Li_2MnO_4$, $Li(Ni_aCo_bMn_c)O_2$ where $0<a<1$, $0<b<1$, $0<c<1$, and $a+b+c=1$, $LiNi_{1-y}Co_yO_2$, $LiCo_{1-y}Mn_yO_2$, $LiNi_{1-y}Mn_yO_2$ where $0\leq Y<1$, $Li(Ni_aCo_bMn_c)O_4$ where $0<a<2$, $0<b<2$, $0<c<2$, and $a+b+c=2$, $LiMn_{2-z}Ni_zO_4$, and $LiMn_{2-z}Co_zO_4$ where $0<Z<2$, or a mixture of two or more of these materials.

In addition, the conductive material, the binder, and the filler may be identical to or different from those used in the negative electrode active material.

The separator is disposed between the positive electrode and the negative electrode, and may be an insulating thin film having high ion permeability and high mechanical strength. The separator may generally have a pore diameter of 0.01 μm to 10 μm, and may generally have a thickness of 5 μm to 300 μm.

As the separator, for example, sheets or non-woven fabrics, made of an olefin-based polymer such as polypropylene; or glass fiber or polyethylene, which have chemical resistance and hydrophobicity, or Kraft paper is used. Examples of commercially available separators include the Celgard series such as Celgard™ 2400 and 2300 (available from Hoechest Celanese Corp.), polypropylene separators (available from Ube Industries Ltd., or Pall RAI Co.), and the polyethylene series (available from Tonen or Entek).

In some cases, a gel polymer electrolyte may be coated on the separator to enhance battery stability. Examples of gel polymers include, but are not limited to, polyethylene oxide, polyvinylidenefluoride, and polyacrylonitrile. When a solid electrolyte such as a polymer or the like is used as an electrolyte, the solid electrolyte may also serve as a separator.

The lithium salt-containing non-aqueous electrolyte includes a non-aqueous electrolyte and a lithium salt. As the non-aqueous electrolyte, a non-aqueous electrolyte solution, an organic solid electrolyte, an inorganic solid electrolyte, or the like is used.

The non-aqueous electrolyte solution may be, for example, an aprotic organic solvent such as N-methyl-2-pyrrolidinone, propylene carbonate, ethylene carbonate, butylene carbonate, dimethyl carbonate, diethyl carbonate, ethyl methyl carbonate, γ-butyrolactone, 1,2-dimethoxy ethane, 1,2-diethoxy ethane, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Non-limiting examples of the organic solid electrolyte include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

In addition, the lithium salt is a material that is readily soluble in the non-aqueous electrolyte. Non-limiting examples of the lithium salt include LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ethers, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ethers, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas.

MODE OF THE INVENTION

Hereinafter, the present invention will be described in further detail with reference to the following examples. However, these examples according to the present invention may be modified in many different forms, and should not be construed as limiting the scope of the present invention. The examples of the present invention are provided to more completely explain the present invention to those of ordinary skill in the art.

EXAMPLES

Example 1

(Manufacture of Negative Electrode Current Collector)

5 g of CNTs were dispersed in 100 g of isopropyl as a solvent to prepare a CNT dispersion, and then the CNT dispersion was sprayed onto distilled water to form a CNT film on a water surface.

Subsequently, copper (Cu) foil having a thickness of 10 μm was transferred at a rate of 30 m/min in a roll-to-roll manner after being unwound while passing through the water at an angle of 30° such that one surface of the Cu foil was brought into contact with one end of the CNT film formed on the water surface, forming a CNT coating layer having a thickness of about 50 nm on a surface of the Cu foil.

Thereafter, the Cu foil with the CNT coating layer formed thereon was heat treated by hot air at 120° C. for 20 seconds while being rewound to cure the CNT coating layer, thereby completing the manufacture of a negative electrode current collector with the CNT coating layer formed thereon (see FIG. 4).

(Manufacture of Negative Electrode)

97.2 parts by weight of graphite as a negative electrode active material, 1.5 parts by weight of polyvinylidene fluoride as a binder, and 1.3 parts by weight of Super-P as a conductive material were dispersed in N-methylpyrrolidone to prepare a negative electrode active material slurry.

The negative electrode active material slurry was applied on the negative electrode current collector manufactured using the above-described processes with a thickness of 65 μm, followed by roll pressing, thereby completing the manufacture of a negative electrode.

(Manufacture of Lithium Secondary Battery)

LiNi$_{0.33}$Mn$_{0.33}$Co$_{0.33}$O$_2$ as a positive electrode active material, acetylene black as a conductive material, and SBR as a binder were mixed in a weight ratio of 94:3.5:2.5, and then the resulting mixture was added to NMP to prepare a positive electrode active material slurry. The prepared slurry was applied on one surface of aluminum (Al) foil, followed by roll pressing, thereby completing the manufacture of a positive electrode.

A polyolefin separator was disposed between the positive electrode and the negative electrode, and then an electrolyte prepared by dissolving 1M LiPF$_6$ in a mixed solvent of ethylene carbonate (EC) and diethyl carbonate (DEC) in a volume ratio of 30:70 was injected into the resulting structure, thereby completing the manufacture of a lithium secondary battery.

Example 2

10 g of CNTs were dispersed in 100 g of isopropyl as a solvent to prepare a CNT dispersion, and then the CNT dispersion was sprayed onto distilled water to form a CNT film on a water surface.

Subsequently, copper (Cu) foil having a thickness of 10 μm was transferred at a rate of 50 m/min in a roll-to-roll manner after being unwound while passing through the water at an angle of 30° such that one surface of the Cu foil was brought into contact with one end of the CNT film formed on the water surface, forming a CNT coating layer having a thickness of about 50 nm on a surface of the Cu foil.

Thereafter, the Cu foil with the CNT coating layer formed thereon was heat treated by hot air at 120° C. for 20 seconds while being rewound to cure the CNT coating layer, thereby completing the manufacture of a negative electrode current collector with the CNT coating layer formed thereon (see FIG. 4).

A negative electrode and a lithium secondary battery including the same were manufactured in the same manner as in Example 1, except that the negative electrode current collector manufactured according to the above-described processes was used.

Comparative Example 1

A negative electrode and a lithium secondary battery including the same were manufactured in the same manner as in Example 1, except that Cu foil not including the CNT coating layer formed thereon was used instead of the negative electrode current collector manufactured according to Example 1.

Comparative Example 2

5 g of CNTs and 1 g of a polyvinylidenefluoride (PVdF) polymer as a binder were mixed in distilled water, and then were subjected to dip coating to form a CNT coating layer having a thickness of 8 μm on a surface of Cu foil, thereby completing the manufacture of a negative electrode current collector.

A negative electrode and a lithium secondary battery including the same were manufactured in the same manner as in Example 1, except that the negative electrode current collector manufactured according to the above-described processes was used instead of the negative electrode current collector of Example 1.

Experimental Example 1

Measurement of Resistance of Secondary Battery

Resistance (Ω) according to component of each of the secondary batteries manufactured according to Examples 1 and 2 and Comparative Examples 1 and 2 was measured, and the results thereof are shown in Table 1 below (conditions: SOC 50, 25° C.).

In particular, the measurement of resistance according to component was performed by electrochemical impedance spectroscopy (EIS) in which resistance according to component of a secondary battery is separated via measurement of impedance by applying minute alternating current signals with different frequencies to the cell. The EIS experiment is susceptible to temperature, and thus was performed in a chamber at 25° C., which is similar to room temperature, to reduce errors.

TABLE 1

| | Resistance (Ω) | |
|---|---|---|
| | Charge Transfer Resistance | Diffusion Resistance |
| Example 1 | 0.9 | 1.1 |
| Example 2 | 1.1 | 1.1 |
| Comparative Example 1 | 1.6 | 1.2 |
| Comparative Example 2 | 1.5 | 1.3 |

Referring to Table 1, it can be confirmed that the batteries of Examples 1 and 2 exhibited a lower charge transfer resistance than that of the batteries of Comparative Examples 1 and 2, and exhibited similar diffusion resistance. This is determined due to the fact that electronic conductivity is improved due to formation of the CNT coating layer on the negative electrode foil, resulting in enhanced charge transfer resistance, and it can be confirmed that the diffusion resistances, which are a resistance associated with pores of an electrode, or the like, of the batteries of the present invention are similar to each other. A higher concentration of CNTs were used in Example 2 than in Example 1, and, accordingly, the charge transfer resistance is seen as being slightly increased in Example 2 compared to that in Example 1. In addition, in Comparative Example 2, a negative electrode current collector manufactured by mixing CNTs and a polymer binder in a solvent and then coating the metal foil with the resulting mixture by dip coating was used, and thus the charge transfer resistance is seen as being slightly increased compared to that in Comparative Example 1, but Comparative Example 2 still shows a higher resistance than that of Examples 1 and 2. This is because electrical conductivity of a polymer included as a binder is poor, and thus the polymer binder forms a thick film together with the CNTs and, as a result, serves as a non-conductor.

Experimental Example 2

Evaluation of Lifespan According to Cycle

Figure 6:
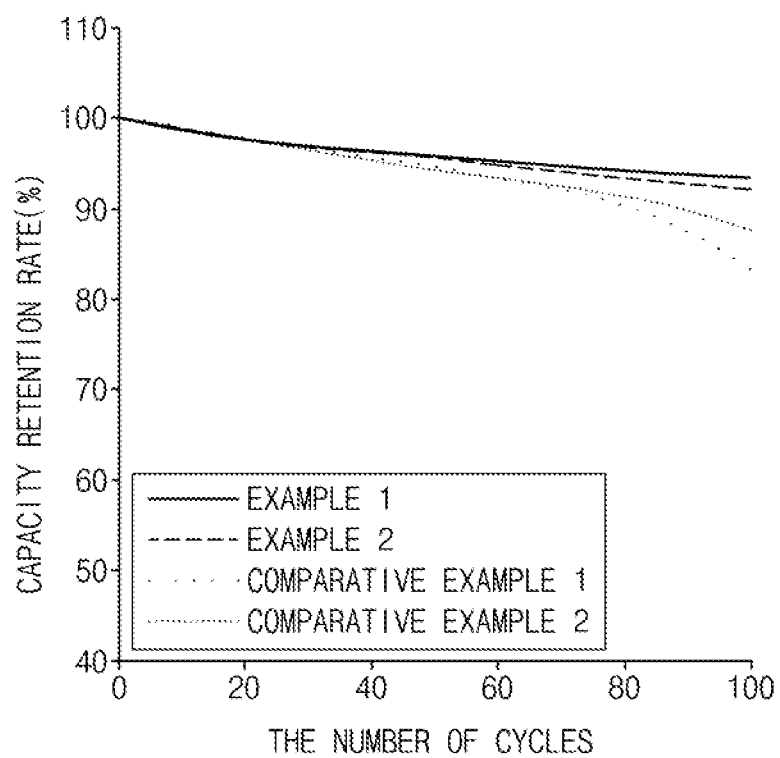
FIG. 6 is a comparative graph showing capacity retention rates according to cycle of secondary batteries manufactured according to Examples 1 and 2, and Comparative Examples 1 and 2.

Lifespans according to cycle of the lithium secondary batteries of Examples 1 and 2 and Comparative Examples 1 and 2 were evaluated, and the results thereof are shown in FIG. 6.

In particular, each of the lithium secondary batteries of Examples 1 and 2, and Comparative Examples 1 and 2 having a battery capacity of 50 mAh was charged at a constant current of 0.33 C and 2.5 V until the voltage reached 4.25 V, and then charged at a constant voltage of 4.25 V, and the charging was cut off when the charge current reached 2.5 mA. Subsequently, each secondary battery was allowed to stand for 30 minutes, and then discharged at a constant current of 0.33 C until the voltage reached 2.5 V. This charging/discharging behavior is denoted as the $1^{st}$ cycle, and this cycle was repeated 100 times, and then capacity retention rates according to cycle of the lithium secondary batteries of Examples 1 and 2, and Comparative Examples 1 and 2 were measured, and the results thereof are shown in FIG. 6.

As shown in FIG. 6, it was confirmed that the lithium secondary batteries of Examples 1 and 2 exhibited a capacity retention rate of 90% or more while the cycle was repeated 100 times, while the lithium secondary batteries of Comparative Examples 1 and 2 exhibited a rapidly decreased capacity retention rate after the $40^{th}$ cycle and thus exhibited a capacity retention rate of about 80%. This is because, in the cases of the lithium secondary batteries of Examples 1 and 2, the CNT coating layer formed on the surface of the negative electrode current collector without physical damage maintains a conductive network between the CNT coating layer and an electrode during the cycle of charging and discharging of the lithium secondary battery, and thus an increase in resistance is suppressed. Accordingly, as in Examples 1 and 2, a lithium secondary battery including such a CNT coating layer exhibits excellent lifespan characteristics.

The invention claimed is:

1. A method of manufacturing a current collector for an electrode for a secondary battery, the method comprising:
   preparing a carbon nanotube (CNT) dispersion by dispersing CNTs in a dispersion solvent;
   forming a CNT film on a water surface by spraying the CNT dispersion onto water;
   forming a CNT coating layer on a metal foil by unwinding the metal foil and passing the metal foil through the water at an angle such that one surface of the metal foil is brought into contact with one end of the CNT film formed on the water surface; and
   curing the CNT coating layer by heat treatment while rewinding the metal foil with the CNT coating layer formed thereon.

2. The method of claim 1, wherein the dispersion solvent comprises one selected from the group consisting of distilled water, an alcohol, acetonitrile, and acetone, or a mixture of two or more of these materials.

3. The method of claim 1, wherein the CNTs comprise multi-walled CNTs having a diameter of 5 nm to 100 nm.

4. The method of claim 1, wherein the CNT dispersion is prepared by dispersing 0.1 wt % to 10 wt % of the CNTs in the dispersion solvent.

5. The method of claim 1, wherein the metal foil is transferred at a rate of 10 m/min to 50 m/min.

6. The method of claim 1, wherein the metal foil is transferred at an angle of 20° to 45° with respect to the water surface.

7. The method of claim 1, wherein the metal foil comprises copper, stainless steel, aluminum, nickel, titanium, or calcined carbon; stainless steel surface-treated with carbon, nickel, titanium, or silver; or an aluminum-cadmium alloy.

8. The method of claim 1, wherein the metal foil has a thickness of 3 μm to 500 μm.

9. The method of claim 1, wherein the curing is performed by applying hot air at a temperature ranging from 70° C. to 130° C. for a residence time of 10 seconds to 1 minute.

10. The method of claim 1, wherein the method further comprises forming an electrode mixture layer by applying an electrode slurry on the CNT coating layer while transferring the metal foil with the CNT coating layer formed thereon, and then pressing and drying the resulting structure.

11. The method of claim 10, wherein the electrode slurry is a negative electrode slurry.

12. An electrode for a secondary battery, comprising:
   the current collector manufactured according to the method of claim 1; and
   an electrode mixture layer formed on an outer surface of the CNT coating layer.

13. The electrode of claim 12, wherein the CNT coating layer comprises multi-walled CNTs.

14. The electrode of claim 12, wherein the CNT coating layer has a thickness of 10 nm to 5 μm.

15. The electrode of claim 12, wherein the electrode is a negative electrode.

16. A lithium secondary battery comprising the electrode for a secondary battery of claim 12.

* * * * *